No. 727,026. Patented May 5, 1903.

UNITED STATES PATENT OFFICE.

JULIUS TAFEL, OF WÜRZBURG, GERMANY, ASSIGNOR TO C. F. BOEHRINGER & SOEHNE, OF MANNHEIM-WALDHOF, GERMANY, A FIRM.

CAMPHIDIN AND METHOD OF PREPARING SAME.

SPECIFICATION forming part of Letters Patent No. 727,026, dated May 5, 1903.

Original application filed April 3, 1901, Serial No. 54,155. Divided and this application filed August 13, 1902. Serial No. 119,529. (No specimens.)

*To all whom it may concern:*

Be it known that I, JULIUS TAFEL, a citizen of Germany, residing at Würzburg, Germany, have invented certain new and useful Improvements in Camphidin and Method of Preparing Same; and I do hereby declare the following to be a full, clear, and exact description of the invention, such as will enable others skilled in the art to which it appertains to make and use the same.

The present invention relates to the manufacture of derivatives of camphoric acid, and more particularly to the preparation of products richer in hydrogen than imido-camphoric acid.

I have found that by subjecting imido-camphoric acid, which has the formula $C_{10}H_{15}NO_2$, to electrolytic reduction a new body poorer in oxygen and richer in hydrogen and having the composition $C_{10}H_{17}NO$ may be obtained, which new compound I term "camphidon." The reaction proceeds in a manner similar to that involved in the production of pyrolidon from succinimid. If the reduction in the latter case is continued somewhat further, some pyrolidin is concurrently obtained, as is known. In a similar manner a higher hydrated body, which I term "camphidin," is formed together with the camphidon if the reduction is carried further.

The camphidin and its method of manufacture are the invention covered in the present application.

The new compound camphidin, which is to serve as a pharmacal compound, is prepared in the following manner, which I consider the preferred way of carrying out my invention.

One kilogram of imido-camphoric acid is dissolved in sufficient sulfuric acid of sixty-five per cent. strength to make ten liters of solution, which is then poured into the cathode-compartment of an electrolytic cell or bath. The anode-compartment having been similarly charged with dilute sulfuric acid, the current is passed through the cell for three and one-half hours, said current having a concentration of strength of one hundred and twenty amperes per liter of the electrolyte and the cathode-surface being ten square decimeters per liter of electrolytic bath. The cathode employed is a lead cathode prepared according to the method given by myself in *Berichte d. Deutschen Chemische Gesellschaft*, Vol. 33, page 2209. After the reduction has been completed the major portion of the sulfuric acid is removed by precipitation with calcium carbonate, filtering and extracting the resultant camphidon from the filtrate by repeated shaking with chloroform. Upon thereafter evaporating the chloroform the camphidon is left as a soft crystalline mass having a weak or faint camphor-like odor.

From the acid filtrate, from which the camphidon has been removed in the manner indicated above, the new compound camphidin is obtained by first supersaturating with an alkali, such as soda-lye, and then driving off the camphidin with steam. It is thus obtained as a light soft crystalline mass having an intense camphor-like odor. Its composition is indicated by the formula $C_{10}HI_{19}N$. At 188° centigrade it melts to form a colorless liquid which distils without decomposition at 209° centigrade. It is soluble with considerable difficulty in cold and hot water. It is distinguished from camphidon by its volatility under the influence of steam or aqueous vapor and by its strong basicity.

The camphidon and its manufacture, while described herein for the purposes of a full disclosure, are not claimed in this application, since they are fully described and claimed in my application, Serial No. 54,155, filed April 3, 1901, of which this is a divisional application.

What I claim, and desire to secure by Letters Patent of the United States, is—

1. The process which consists in submitting a solution of imido-camphoric acid in sulfuric acid in the cathode-compartment of an electrolytic cell to the action of the electric current and then removing the greater portion of the sulfuric acid and treating the remainder with chloroform to separate the resultant camphidon, then supersaturating the remainder with an alkali to isolate the camphidin.

2. The process which consists in submitting a solution of imido-camphoric acid in sulfuric acid in the cathode-compartment of an electrolytic cell to the action of the electric current and then adding calcium carbonate to precipitate the greater portion of the sulfuric acid, filtering and extracting the filtrate with chloroform, then supersaturating the remainder with an alkali and driving off the resultant camphidin with steam.

3. As a new chemical compound camphidin having the formula $C_{10}H_{19}N$, melting at 188°, centigrade, to a colorless liquid and distilling at 209°, centigrade, said new compound being a strong base, soluble with difficulty in water, having a camphor-like odor.

In testimony whereof I have affixed my signature in presence of two witnesses.

JULIUS TAFEL.

Witnesses:
F. L. REINOR,
WILH. WISLICCUUS.